US012578231B2

(12) United States Patent
Che et al.

(10) Patent No.: US 12,578,231 B2
(45) Date of Patent: Mar. 17, 2026

(54) THERMAL IMAGER USING THREE-DIMENSIONAL ULTRASOUND IMAGING SYSTEM

(71) Applicant: Fluke Corporation, Everett, WA (US)

(72) Inventors: Guofeng Che, Beijing (CN); Xugang Chen, Shanghai (CN); Yan Yuan, Shanghai (CN)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 19/022,782

(22) Filed: Jan. 15, 2025

(65) Prior Publication Data

US 2025/0231067 A1 Jul. 17, 2025

(51) Int. Cl.
*G01J 5/02* (2022.01)
*G01J 5/03* (2022.01)
*G01J 5/48* (2022.01)
*G01S 15/10* (2006.01)
*G01J 5/00* (2022.01)

(52) U.S. Cl.
CPC ........... *G01J 5/0275* (2013.01); *G01J 5/0265* (2013.01); *G01J 5/03* (2022.01); *G01J 5/48* (2013.01); *G01S 15/10* (2013.01); *G01J 2005/0077* (2013.01)

(58) Field of Classification Search
CPC .... G01J 5/0275; G01J 5/03; G01J 5/48; G01J 5/0265; G01J 2005/0077
See application file for complete search history.

(56) References Cited

U.S. PATENT DOCUMENTS

| | | | | |
|---|---|---|---|---|
| 2013/0127980 A1* | 5/2013 | Haddick | ................. | G06F 3/013 |
| | | | | 348/14.08 |
| 2023/0228626 A1* | 7/2023 | Shim | ...................... | H04N 23/20 |
| | | | | 374/121 |
| 2025/0203182 A1* | 6/2025 | Moon | ................... | H04N 13/254 |
| 2025/0231067 A1* | 7/2025 | Che | ........................... | G01J 5/03 |

FOREIGN PATENT DOCUMENTS

| | | | | | |
|---|---|---|---|---|---|
| CN | 106679817 B | * | 8/2019 | ................ | G01J 5/00 |
| CN | 113390514 A | * | 9/2021 | ................ | G01J 5/00 |
| CN | 115524013 A | * | 12/2022 | ................ | G01J 5/00 |
| CN | 113959566 B | * | 11/2023 | ............ | G01J 5/0096 |
| CN | 119126639 A | * | 12/2024 | ............ | G01D 21/02 |
| CN | 119290172 A | * | 1/2025 | ................ | G01J 5/00 |
| KR | 20250068034 A | * | 5/2025 | ............ | H04N 23/23 |
| NL | 2025791 B1 | * | 1/2022 | ............ | G01J 5/0275 |
| WO | WO-2021215600 A1 | * | 10/2021 | ............ | G01N 29/42 |

* cited by examiner

*Primary Examiner* — Glenton B Burgess
(74) *Attorney, Agent, or Firm* — Dority & Manning, P.A.

(57) ABSTRACT

The present disclosure provides a thermal imaging system that uses the 3D ultrasound imaging system to transmit outgoing ultrasonic waves and receive incoming ultrasonic waves and then to determine distance data of one or more objects of a target scene based on the incoming waves. The thermal imaging system then detects initial temperature values of the one or more objects using an infrared temperature system. Based on the distance data and the initial temperature values, the thermal imaging system determines adjusted temperature values for the one or more objects.

20 Claims, 7 Drawing Sheets

DETERMINING RESPECTIVE DISTANCE DATA OF A PLURALITY OF OBJECTS IN A SCENE
710

OBTAINING RESPECTIVE INITIAL TEMPERATURE INFORMATION OF THE PLURALITY OF OBJECTS
720

DETERMINING ADJUSTED TEMPERATURE INFORMATION FOR THE PLURALITY OF OBJECTS BASED ON THE RESPECTIVE DISTANCE DATA AND THE RESPECTIVE INITIAL TEMPERATURE VALUES
730

THERMAL IMAGER USING THREE-DIMENSIONAL ULTRASOUND IMAGING SYSTEM

CROSS-REFERENCE TO RELATED APPLICATION

This application claims priority to Chinese Application No. 202410057900.3, filed Jan. 15, 2024, the entirety of which is incorporated by reference herein for all purposes.

FIELD

The present disclosure relates generally to thermal imagers. More particularly, the present disclosure relates to systems and methods for thermal imagers that include a three-dimensional ultrasound imaging system.

BACKGROUND

Thermal imagers, also known as infrared cameras or thermographic cameras, are devices that are able to visualize and capture the heat (infrared) radiation emitted by objects in the environment. Thermal imagers are particularly useful for detecting temperature differences and creating images based on thermal radiation, even in complete darkness or through obstacles like smoke or fog.

Thermal imagers commonly use infrared technology to measure the temperature of objects. In particular, objects with temperature above absolute zero emit infrared radiation, with their intensity and wavelength varying based on the object's temperature. Thermal imagers detect this radiation using an infrared sensor, converting it into temperature data.

Thermal imagers' ability to measure temperature can be improved if distance information is also available. In particular, thermal imagers can use "distance compensation" to adjust temperature readings based on the distance to an observed object. Accounting for the inverse square law's effect on infrared radiation intensity, a correction algorithm, often calibrated during manufacturing, can be performed to refine the temperature data considering the object's distance, ensuring an accurate temperature representation.

Certain existing thermal imagers will utilize a laser rangefinder to measure a single distance for the scene. However, the use of a laser-rangefinder gives distance information of only one point on a target, and therefore, cannot provide distance information for multiple targets in a scene at the same time. Thus, thermal imagers which rely upon laser-based distance measurement cannot accurately measure the temperature of multiple objects since the laser cannot provide distance information for multiple objects simultaneously.

SUMMARY

Aspects and advantages of embodiments of the present disclosure will be set forth in part in the following description, or can be learned from the description, or can be learned through practice of the embodiments.

One example aspect of the present disclosure is directed to a thermal imager that combines thermal data with three-dimensional (3D) ultrasound imaging. The thermal imager includes an infrared system to generate initial temperature information for one or more objects in a target scene. The thermal imager includes an ultrasound system to determine distance data for the one or more objects. The thermal imager includes a processor, coupled to the infrared system and the ultrasound system, configured to generate adjusted temperature information for the one or more objects based on the distance data and the initial temperature information, and to generate an image illustrating the adjusted temperature information corresponding to the one or more objects in the target scene.

Another example aspect of the present disclosure is directed to a method for measuring temperature. The method includes determining, by an ultrasound system, respective distance data of a plurality of objects in a scene. The method includes obtaining, by an infrared system, respective initial temperature information of the plurality of objects. The method includes determining adjusted temperature information for the plurality of objects based on the respective distance data and the respective initial temperature values.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
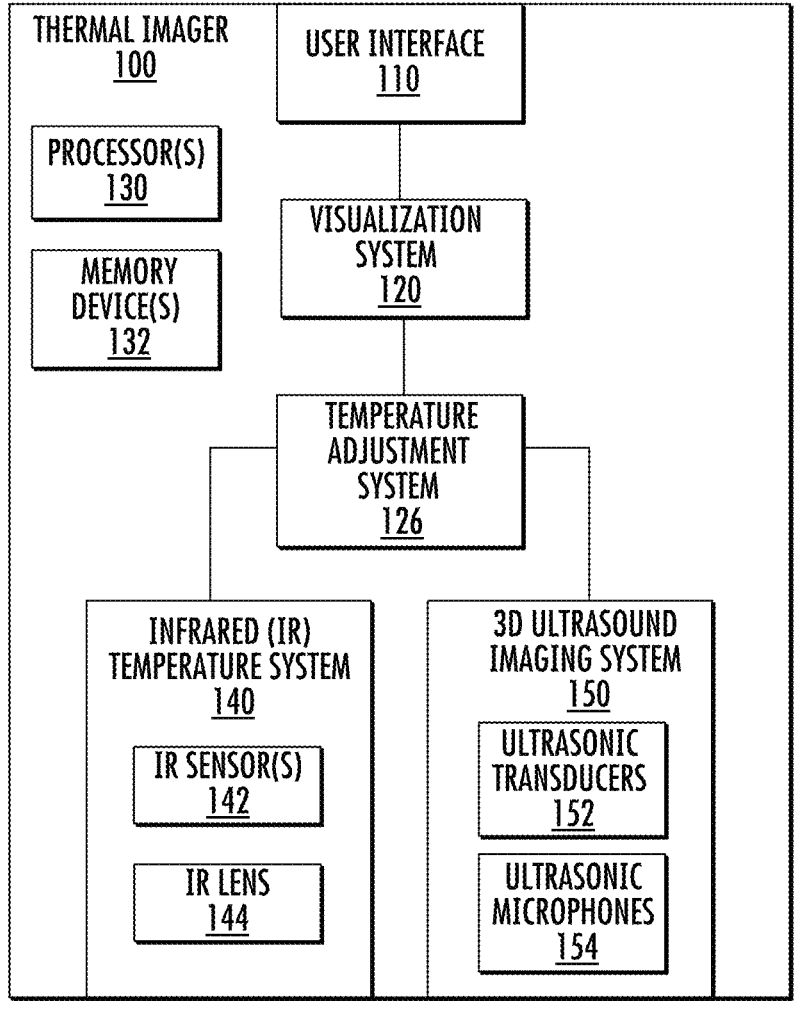
FIG. 1 depicts a block diagram of an example thermal imager according to example embodiments of the present disclosure.

Current thermal imagers struggle to accurately measure the temperature of multiple objects in a scene because they rely on laser rangefinders which can only measure the distance to a single point in the target. This limitation means that they cannot account for the varying distances of multiple objects in a scene, leading to inaccuracies in temperature readings.

The present disclosure introduces a thermal imager that uses 3D ultrasound imaging to obtain distance data for multiple objects in a scene, which enables more accurate temperature readings. This tool, which can be handheld and portable, combines thermal data with ultrasound data to provide a comprehensive view of the environment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a thermal imager that combines thermal data with three-dimensional (3D) ultrasound imaging. This technology can generate thermal data for a target scene, which may include one or more objects. The thermal data can include initial temperature values for these objects. The 3D ultrasound imaging system can transmit outgoing ultrasonic waves and receive incoming ultrasonic waves, determining distance data for the objects based on the incoming waves.

A unique aspect of this technology is its ability to generate adjusted temperature values based on the distance data. A temperature adjustment system, for example executed by a processor, can use the distance data and the initial temperature values to calculate these adjusted temperature values.

In particular, as discussed above, certain existing thermal imagers are equipped with a built-in laser to measure distance. However, the laser only gives distance information of only one point on a target, and therefore, cannot provide distance information for multiple targets in a scene at the same time. Thus, the thermal imagers featuring laser-based ranging cannot accurately measure the temperature of multiple objects since the laser cannot provide distance information for multiple objects simultaneously.

In contrast, because the thermal imagers of the present disclosure use ultrasound-based distance estimation, the proposed imagers are able to obtain multiple distance measurements that cover the entire target scene. Thus, a specific distance measurement can be obtained for each different object or portion of the scene. The initial temperature value estimated for each object or portion of the scene can be adjusted based on its specific distance value (e.g., as opposed to one single value for the entire scene). Therefore, the respective adjusted temperature value generated for each object or portion of the scene is more accurate.

Thus, the present disclosure can allow for more accurate thermal imaging, which can be particularly useful in fields where precise temperature readings can be critical. For instance, this technology can be used in a variety of settings, such as in surveillance systems, firefighting equipment, or medical devices, providing a more comprehensive view of the environment.

In some implementations, the thermal imager can be a portable, handheld device. It can include a housing and a display, with the infrared temperature system, the 3D ultrasound imaging system, and the visualization system all housed within the device. This portability can make the device versatile and useful in a range of environments, from construction sites to medical clinics.

In some implementations, the 3D ultrasound imaging system can include multiple ultrasonic transducers and ultrasonic microphones. The transducers can emit the outgoing ultrasonic waves, while the microphones can receive the incoming waves. This setup can enable the system to gather more detailed and accurate data, enhancing the overall performance of the thermal imager.

In some implementations, the 3D ultrasound imaging system can include at least one ultrasonic transducer and four ultrasonic microphones. The ultrasonic microphones are positioned in horizontal and vertical directions on the 3D ultrasound imaging system, and two ultrasonic microphones are placed in each direction. The transducer can be placed at any position on the 3D ultrasound imaging system, however, as a center position is generally occupied by the infrared temperature system, transducer can be placed, for example, in a corner. Thus, as one example, the locations of the ultrasonic microphones, except for avoiding the infrared temperature system, can be placed horizontally or vertically, where two ultrasonic microphones are placed in each direction, with a spacing approximately equal to odd times the half wavelength of the selected transducer.

In some implementations, the ultrasonic transducer emits outgoing ultrasonic waves, while the ultrasonic microphone collects the incoming ultrasonic waves returned after detecting the one or more objects, and thus, the direction and distance of one or more objects object can be measured. The 3D ultrasound imaging system then uses direction and distance data to adjust temperature measurement parameters of the thermal imager. The relationship between distance and temperature can be realized through calibration.

In some implementations, the outgoing ultrasonic waves can be dual-frequency pulses. This means that the transducers can emit waves at two different frequencies. This feature can enhance the device's ability to accurately determine the distance and direction of the objects within the target scene.

In some implementations, the infrared temperature system can include an infrared (IR) lens with one or more associated IR sensors. These sensors can generate thermal images of the target scene. This feature can enhance the accuracy of the thermal data, leading to more precise temperature readings.

In some implementations, the ultrasonic transducers and microphones can be arranged around the IR lens. This arrangement can help to ensure that the ultrasonic waves and the thermal data are focused on the same area, leading to more accurate and comprehensive imaging.

According to one aspect, the 3D ultrasound imaging system can also determine directional data of the objects according to the outgoing and incoming ultrasonic waves. This can provide additional information about the objects' location and orientation, which can be useful in a variety of applications, from navigation systems to robotics.

Specifically, the 3D ultrasound imaging system can determine time and speed data of the objects. Time and speed data can be process parameters, for example used to obtain the distance information of the one or more objects. Due to ultrasonic microphone arrangements, the direction information can be calculated through beam synthesis. As discussed earlier, the 3D ultrasound imaging system uses direction and distance data to adjust temperature measurement parameters of the thermal imager. The relationship between distance and temperature can be realized through calibration. This can provide information about the objects' movement, which can be particularly useful in various applications.

The thermal imager technology disclosed herein can offer several technical effects and benefits. One of the main benefits is the potential increase in accuracy of temperature readings. By combining thermal data with 3D ultrasound imaging, the technology can provide adjusted temperature values based on distance data. The adjusted temperature values can be more accurate and precise. This can be especially beneficial in environments where accurate and precise temperature readings are crucial. Thus, the thermal imagers described herein represent a technical solution to the technical problem of how to generate more accurate temperature readings.

The thermal imager can be applied to a number of applications. As one example, the thermal imager can enhance the performance of computing systems. For instance, in a data center, the thermal imager can be used to monitor the temperature of various components and systems. By providing accurate temperature readings, the technology can help ensure that the computing systems are operating within their optimal temperature range. This can lead to improved performance and longevity of the systems.

Furthermore, the thermal imager can also decrease energy utilization and increase efficiency. By providing precise temperature readings, the technology can help identify areas where energy is being wasted. For instance, in a building, the thermal imager can be used to detect areas where heat is escaping, such as through windows or doors. This information can then be used to improve insulation, leading to decreased energy usage and increased efficiency.

In summary, the thermal imager technology disclosed herein can provide various technical effects and benefits, including increased accuracy of temperature readings, enhanced performance of computing systems, decreased energy utilization, and increased efficiency. These benefits can make the technology a valuable tool in a wide range of settings.

With reference now to the Figures, example embodiments of the present disclosure will be discussed in further detail.

FIG. 1 depicts a block diagram of an example thermal imager according to example embodiments of the present disclosure. The example thermal imager (100) can include a user interface (110), a visualization system (120), a temperature adjustment system (126), processor(s) (130), an infrared (IR) temperature system (140), and a 3D ultrasound imaging system (150).

The IR temperature system (140) in the thermal imager (100) is a component that allows the thermal imager (100) to measure initial temperature values across an entirety of a target scene using infrared radiation. The target scene can in some instances include multiple objects. The IR temperature system (140) can include an IR lens (144) with one or more associated IR sensors (142).

The one or more IR sensors (142) can generate thermal data of the object(s) in the target scene. For instance, objects with temperature above absolute zero emit infrared radiation, with their intensity and wavelength varying based on the object's temperature. The one or more IR sensors (142) detect and measure the infrared radiation emitted by multiple objects in the scene. The IR temperature system (140) can convert the measured infrared radiation into thermal data by performing an algorithmic process that translates the intensity and wavelength of the emitted radiation into corresponding temperature values. Thus, the thermal data can include initial temperature values for each portion of the scene (e.g., including each of the multiple objects).

The IR lens (144) is an optical component designed to focus infrared light. The thermal imager (100) uses the IR lens (144) to focus infrared radiation emitted by multiple objects to create thermal images that show temperature variations. For example, the IR temperature system (140) can be equipped with a sophisticated detection mechanism that can differentiate between varying intensities and wavelengths of infrared radiation, thereby accurately determining the temperature of different objects within the scene.

The thermal imager (100) also includes the 3D ultrasound imaging system (150). The 3D ultrasound imaging system (150) provides precise distance measurements, generated through the interpretation of reflected ultrasonic waves, which are further used to formulate 3D visualizations of the target scene. The 3D ultrasound imaging system (150) can include multiple ultrasonic transducers (152) and multiple ultrasonic microphones (154).

The multiple ultrasonic transducers (152) can emit outgoing ultrasonic waves in various directions and angles towards the objects in the target scene. When the outgoing ultrasonic waves encounter interfaces of objects in the scene, part of the wave is reflected back. The reflected back ultrasonic waves are also known as echoes or incoming ultrasonic waves. The multiple ultrasonic microphones (154) can receive the incoming ultrasonic waves.

The 3D ultrasound imaging system (150) can determine distance data by analyzing the time delay between the outgoing ultrasonic waves emitted by the ultrasonic transducers (152) and the incoming ultrasonic waves (echoes) received by the ultrasonic microphones (154). Thus, specific distance measurements can be obtained for each different object or portion of the scene. The incoming ultrasonic waves generated by reflections from the scene are used to create a detailed and accurate three-dimensional image of the multiple objects, enhancing the overall performance of the thermal imager. Thus, in some implementations, the outgoing ultrasonic waves have a detection range of a whole surface, and thus can provide distance and direction information of all the objects in the scene.

In some implementations, the outgoing ultrasonic waves emitted from the multiple ultrasonic transducers (152) can be dual-frequency pulses. Dual-frequency pulse technology refers to the use of two different ultrasound frequencies during the imaging process. In traditional ultrasound imaging, a single frequency of ultrasound waves is used to generate images. However, in dual-frequency pulse technology, two different ultrasound frequencies are used in tandem, and this technique is employed to eliminate noises, enhance the quality and accuracy of the generated ultrasound images, specifically, when determining the distance and direction of the objects within the target scene.

In some implementations, the multiple ultrasonic transducers (152) emits waves at two different frequencies. For example, the two different frequencies can be 40 Hz and 45 Hz. In some implementations, the 3D ultrasound imaging system (150) can alternate between the two frequencies, using the comparison of the received signals to enhance image clarity and precision.

In some implementations, the 3D ultrasound imaging system (150) can determine a spatial angle of the incoming ultrasound waves according to the outgoing and incoming ultrasonic waves. The spatial angle can refer to the angle between the direction of the emitted ultrasonic wave and the direction of the reflected wave. Suitable algorithms, such as Multiple Signal Classification (MUSIC) and beaming, can be used to accurately calculate and represent the spatial angle of the incoming ultrasound waves. This can provide orientation and position of objects within the imaged volume. Spatial angles provide a way to define the angles between different vectors or directions in the 3D space. Utilizing spatial angles in ultrasound imaging helps in accurate anatomical visualization, measurement, and interpretation of structures.

In some implementations, the 3D ultrasound imaging system (150) can also determine directional data of the objects according to the outgoing and incoming ultrasonic waves. For example, the 3D ultrasound imaging system (150) can determine directional data of the objects according to the angular variation between the outgoing and incoming ultrasonic waves. Knowledge of the directional data can provide additional information about the objects' location and orientation, which can be useful in a variety of applications, from navigation systems to robotics.

In some implementations, the 3D ultrasound imaging system (150) can also determine time and speed data of the objects. For example, the 3D ultrasound imaging system (150) can determine the speed of moving objects by calculating a variation in time delay and frequency of the reflected waves due to the Doppler effect. The 3D ultrasound imaging system (150) can also track the change in position of objects over time to provide movement data. Knowledge of time and speed data for the objects can provide information about the objects' movement, which can be particularly useful in applications like traffic monitoring or sports analytics.

In some implementations, the 3D ultrasound imaging system (150) of the thermal imager (100) is configured to continuously update the distance data of the one or more objects in the target scene as the objects move. This may involve transmitting outgoing ultrasonic waves and receiving incoming ultrasonic waves at frequent intervals to capture the most current position of each object. The frequency at which the 3D ultrasound imaging system (150) updates the distance data can depend on the speed of the moving object, the complexity of the target scene, the processing capabilities of the thermal imager (100), and/or other factors.

In some implementations, the 3D ultrasound imaging system (150) can also be capable of predicting the future position of the moving object based on its current speed and direction. This predictive capability can allow the thermal imager (100) to anticipate changes in the object's position and adjust its temperature measurements accordingly. For instance, if the 3D ultrasound imaging system (150) predicts that an object will move closer to the thermal imager (100), the temperature adjustment system (126) can adjust the object's temperature value upwards to account for the expected increase in temperature due to the object's closer proximity.

In some implementations, the infrared temperature system (140) of the thermal imager (100) is also configured to continuously update the initial temperature values of the one or more objects as the objects move. This may involve actively scanning the target scene at regular intervals to capture the most current thermal data. The frequency at which the infrared temperature system (140) updates the initial temperature values can depend on the speed of the moving object, the complexity of the target scene, the sensitivity of the infrared sensors, and other factors.

The temperature adjustment system (126) is configured to generate adjusted temperature values based on the distance data obtained from the 3D ultrasound imaging system (150) and the initial temperature values acquired from the IR temperature system (140). The temperature adjustment system (126) serves to rectify the potential inaccuracies in temperature readings that may arise due to the varying distances of multiple objects in the target scene.

In some implementations, the temperature adjustment system (126) can perform a series of calculations using the initial temperature values and the distance data. The system (126) can employ various algorithms or mathematical models to generate adjusted temperature values, which may be more accurate representations of the objects' true temperatures. These adjusted temperature values can then be used by the visualization system (120) to generate thermal images that provide a more accurate depiction of the target scene's thermal landscape.

The temperature adjustment system (126) can take into account the effect of distance on the accuracy of temperature readings. For example, the further an object is from the thermal imager (100), the lower the detected temperature may appear compared to its actual temperature. The temperature adjustment system (126) adjusts these initial temperature readings by considering the distance data, thereby resulting in more accurate temperature values.

In some implementations, the temperature adjustment system (126) can also account for other factors that may affect the accuracy of temperature readings. Examples of such factors include ambient temperature, humidity, and other environmental conditions. The system (126) can include sensors to measure these factors and incorporate them into the adjustment calculations, thereby further enhancing the accuracy of the thermal images produced by the thermal imager (100).

In some implementations, the temperature adjustment system (126) is configured to perform one or more of a variety of different algorithms designed to refine initial temperature readings based on the distance data. One algorithm used by the system (126) could be a linear regression model. This model could analyze the correlation between the distance data and the initial temperature values, and then predict a more accurate temperature reading based on this relationship. The system (126) could also employ a machine learning algorithm that can adapt and improve over time based on the accumulation of data. Through continuous learning, the system (126) can further refine the temperature adjustment process, thereby increasing the accuracy of the thermal images. Another possible algorithm could be a probabilistic model, such as a Bayesian network, which could use probability distributions to model the uncertainty of the temperature readings due to the varying distances of objects. This could provide a more robust estimate of the adjusted temperature values, even in situations with high levels of uncertainty. These algorithms, whether used individually or in combination, could serve to enhance the accuracy and precision of the temperature readings provided by the thermal imager (100), thereby overcoming the limitations of traditional laser rangefinder-based thermal imagers.

In some implementations, the temperature adjustment system (126) may also be capable of predicting future temperature changes of the moving object based on its current temperature trend. For instance, if the object's temperature has been steadily increasing over time, the temperature adjustment system (126) can predict that the object's temperature will continue to increase and adjust the initial temperature value upwards accordingly.

Referring still to FIG. 1, the thermal imager (100) includes the visualization system (120). The visualization system (120) is configured to generate thermal images of the target scene illustrating adjusted temperature values. In some embodiments, the visualization system (120) comprises a graphical processing unit (GPU). The GPU can be responsible for processing the adjusted temperature values and converting them into a graphical form. This may involve color-coding different temperature ranges, enhancing contrast for improved visibility, or applying other graphical effects to improve the clarity and utility of the resulting thermal image.

In some implementations, the visualization system (120) may also include software algorithms to enhance the quality and usefulness of the thermal image. For instance, it may include edge detection algorithms to highlight the boundaries of objects, or feature extraction algorithms to automatically identify and label specific objects in the scene. The visualization system (120) may also include object tracking algorithms, allowing it to track the movement and temperature changes of specific objects over time.

In some implementations, the visualization system (120) may provide a 3D visualization of the thermal data. The 3D visualization can be generated by combining the thermal data with the distance data obtained from the 3D ultrasound imaging system (150). This can provide a more realistic and detailed view of the scene, allowing the user to observe the temperature distribution from different angles and better understand the spatial relationships between objects.

In some embodiments, the visualization system (120) may offer augmented reality (AR) functionality. In this case, the thermal data can be superimposed onto a real-time video feed of the scene, providing a live view of the temperature distribution. This can be particularly useful in applications such as firefighting or maintenance inspections, where it is important to understand the thermal conditions in the context of the physical environment.

In some implementations, the thermal imager (100) is configured to handle multiple different moving objects within the target scene. When detecting moving objects, the infrared temperature system (140) captures the initial temperature values of these objects, while the 3D ultrasound imaging system (150) measures the distance and speed data for each moving object. The temperature adjustment system (126) then uses this distance and speed data, along with the initial temperature values, to calculate adjusted temperature values for each moving object. These adjusted temperature values take into account the changing distances between the thermal imager (100) and the moving objects, providing more accurate temperature readings even as the objects move within the scene. The visualization system (120) uses the adjusted temperature values to generate thermal images of the target scene that accurately reflect the temperature distribution of the moving objects. This capacity to accurately capture and adjust temperature readings of multiple moving objects enhances the utility of the thermal imager (100) in dynamic environments where objects are often in motion.

The thermal imager (100) additionally includes the user interface (110). A display screen can be integrated into the user interface (110) to display captured thermal images and to provide more detailed information and control. For example, the user interface (110) may display thermal images of the target scene illustrating adjusted temperature values generated by the visualization system (120) at each of a number of periodic time intervals. The display may be a touch screen. It might show menus and options, key settings like the selected frequency, signal strength, battery status, or error messages. User interface elements, such as buttons or touch-sensitive controls, can help users navigate through settings and adjust parameters conveniently.

The user interface (110) can enhance the usability and functionality of the device, for example, the user interface could enable users to configure settings, capture thermal images, and access various features of the thermal imager. In some implementations, the user interface (110) could provide an interface for users to interact with the thermal data. This could include functions such as selecting a region of interest for detailed temperature analysis, setting temperature thresholds for alerts, or exporting the thermal data for further analysis.

In some implementations, the thermal imager (100) incorporates a time interval mechanism for updating the temperature measurements of two or more moving objects within the target scene. This feature enables the thermal imager (100) to provide real-time temperature readings of the objects irrespective of their distance from the thermal imager or the motion of the objects.

The time interval can be set according to various factors such as the speed of the moving objects, the computation capability of the thermal imager (100), or the user's specific requirements. The time interval may be fixed or variable, depending on the situation. For example, in a fast-paced environment where the objects are moving quickly, a shorter time interval may be used to ensure that the temperature readings remain up-to-date. Conversely, in a slower-paced environment where the objects are moving more slowly, a longer time interval may be sufficient.

The IR temperature system (140) and the 3D ultrasound imaging system (150) work in tandem, continuously capturing and updating the initial temperature values and the distance data at each time interval. As the objects move, the 3D ultrasound imaging system (150) tracks their position and updates the distance data accordingly. Simultaneously, the IR temperature system (140) captures the latest thermal data and updates the initial temperature values.

The temperature adjustment system (126) then uses this updated information to calculate the adjusted temperature values for each moving object at each time interval. These adjusted temperature values take into account the changing distances between the thermal imager (100) and the moving objects, providing accurate temperature readings that reflect the real-time conditions of the moving objects.

This continuous updating mechanism overcomes the limitations of the prior art thermal imagers, which struggle to provide accurate temperature readings for moving objects. With the use of the time interval mechanism, the thermal imager (100) can provide accurate, real-time temperature readings of moving objects, regardless of their distance from the thermal imager or their motion. This is a significant improvement over prior art thermal imagers and enhances the utility of the thermal imager (100) in dynamic environments where objects are often in motion.

The visualization system (120) uses the adjusted temperature values to generate thermal images of the target scene that accurately reflect the temperature distribution of the moving objects at each time interval. The user interface (110) then displays these thermal images, providing users with a real-time view of the thermal conditions of the moving objects. This real-time view allows users to monitor and respond to changes in the thermal conditions of the moving objects more effectively, enhancing the overall functionality and usability of the thermal imager (100).

Referring still to FIG. 1, the thermal imager (100) also includes processors(s) (130). The processor(s) 130 can include any suitable processing device, such as a microprocessor, microcontroller, integrated circuit, logic device, or other suitable processing device. The processor(s) 130 can execute firmware or software instructions. The thermal imager (100) can also include memory device(s) (132). The memory device(s) (132) can include one or more computer-readable media, including, but not limited to, non-transitory computer-readable media, RAM, ROM, hard drives, flash drives, or other memory devices. The memory device(s) (132) can store information accessible by the processor(s) (130), including computer-readable instructions that can be executed by the processor(s) (130). The instructions can be any set of instructions that when executed by the processor(s) (130), cause the processor(s) (130) to perform operations (e.g., operations attributed herein to systems (140), (150), (126), and/or (120)). The instructions can be software written in any suitable programming language or can be implemented in hardware. In some embodiments, the instructions can be executed by the processor(s) (130) to cause the processor(s) (130) to perform operations, such as the operations for communication, data replication, and data sharing.

Figure 2B:
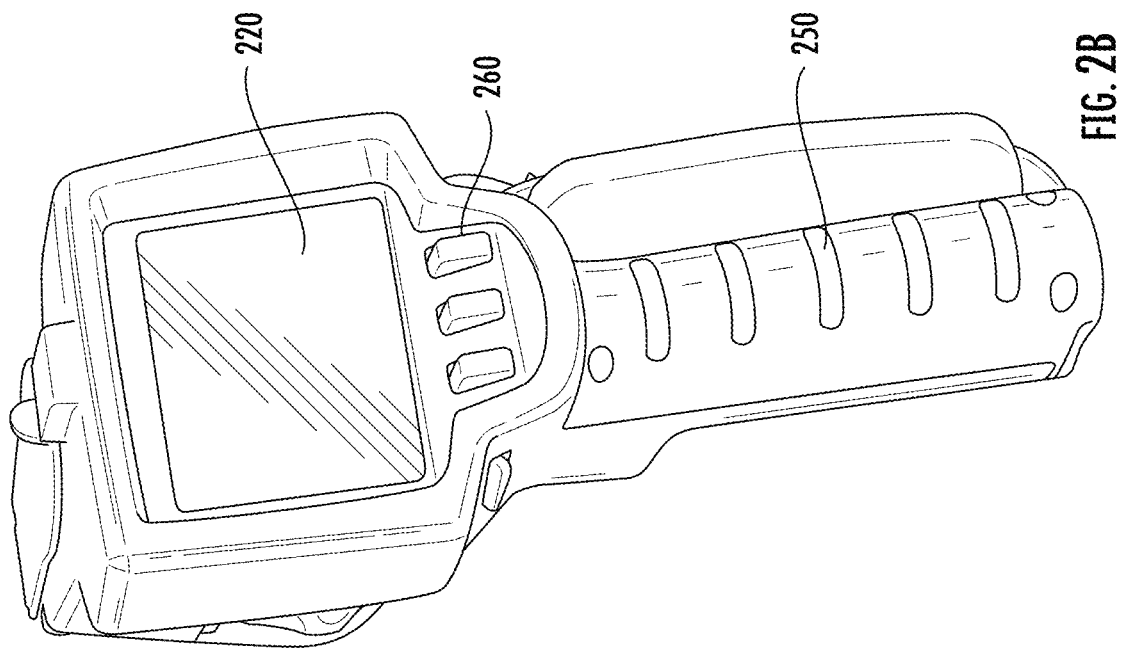
FIGS. 2A and 2B depict a perspective diagram of an example of a portable, handheld thermal imager according to example embodiments of the present disclosure.
Figure 2A:
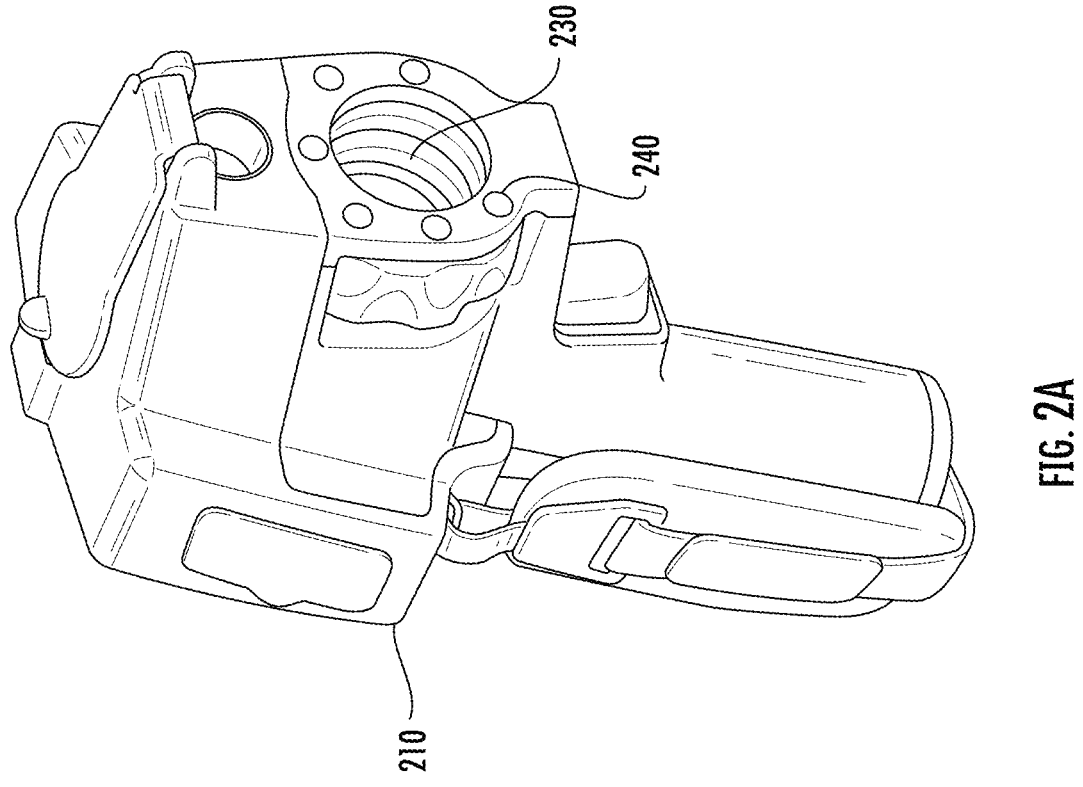

FIGS. 2A and 2B depict perspective diagrams of an example of a portable, handheld thermal imager (200) according to example embodiments of the present disclosure. In particular, FIGS. 2A and 2B illustrate an exemplary embodiment of the thermal imager (200) in a portable, handheld form factor. The thermal imager (200) includes a housing (210) that is designed to encase and protect the various internal components of the device. The housing (210) is ergonomically designed to be easily held and operated with one hand, enhancing the device's usability.

The front face of the thermal imager (200) features a display screen (220). The display screen (220) serves as the primary user interface for the device, allowing users to view the captured thermal images, navigate through the device's menus and options, and interact with its various features. In some implementations, the display screen (220) may be touch-sensitive, allowing users to perform actions such as zooming in on a particular area of the thermal image, selecting a region of interest for detailed analysis, or adjusting the device's settings.

Located on a rear face of the thermal imager (200) are the IR lens (230) and the multiple ultrasonic transducers and microphones (240). The IR lens (230) is a crucial component of the infrared temperature system, responsible for focusing the infrared radiation onto the IR sensors. Surrounding the IR lens (230) are multiple ultrasonic transducers and microphones (240) that are part of the 3D ultrasound imaging system. These components work in tandem to emit outgoing ultrasonic waves and receive incoming waves, enabling the device to measure the distance to multiple objects within the target scene. The particular number, location, and arrangement of the multiple ultrasonic transducers and microphones (240) is provided as an example only. Other numbers, locations, and/or arrangements of the multiple ultrasonic transducers and microphones (240) are possible.

A handle of the thermal imager (200) may feature a grip (250) for the user's comfort and convenience. The grip (250) is designed to provide a secure hold on the device, reducing the risk of accidental drops and enhancing the user's control over the device. The grip (250) may be textured or covered with a non-slip material to further improve the user's grip.

In some implementations, the thermal imager (200) may also include one or more buttons or controls (260) on the side of the housing (210). These controls (260) can provide quick access to commonly used functions, such as capturing a thermal image, switching between different modes, or adjusting the device's settings. These controls (260) can be designed to be easily operable even when the user is wearing gloves or in low-light conditions, making the thermal imager (200) suitable for use in a wide range of environments.

Figure 3:
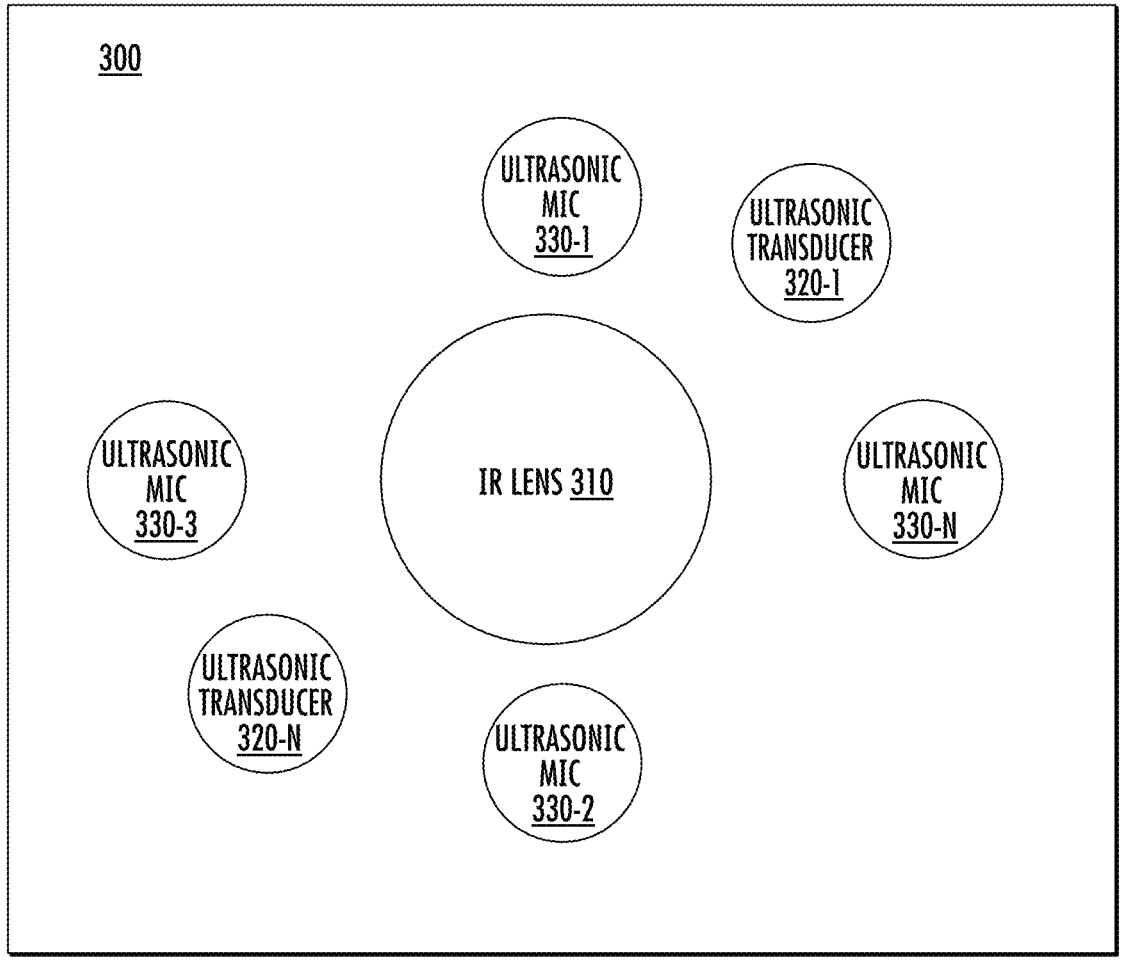
FIG. 3 depicts a graphical diagram of an example of a three-dimensional ultrasound imaging system according to example embodiments of the present disclosure.

FIG. 3 depicts a graphical diagram of an example of a 3D ultrasound imaging system according to example embodiments of the present disclosure. The 3D ultrasound imaging system 300 includes a plurality of ultrasonic transducers (320-1, . . . 320-n) and a plurality of ultrasonic microphones (330-1, 330-2, . . . 330-n). The plurality of ultrasonic transducers (320-1, . . . 320-n) can emit outgoing ultrasonic waves in various directions and angles towards objects in a target scene. The outgoing ultrasonic waves can be dual-frequency pulses, which means that the plurality of ultrasonic transducers (320-1, . . . 320-n) can emit waves at two different frequencies. When the outgoing ultrasonic waves encounter interfaces of objects in a scene, parts of the waves echo back and the plurality of ultrasonic microphones (330-1, 330-2, . . . 330-n) can receive those echoed back or incoming ultrasonic waves. The echoed back or incoming ultrasonic waves can also be dual-frequency pulses, meaning that the plurality of ultrasonic microphones (330-1, 330-2, . . . 330-n) can receive waves at two different frequencies. The 3D ultrasound imaging system then determines distance data for each of the multiple objects in the scene according to the incoming frequency.

In some implementations, the plurality of ultrasonic transducers (320-1, . . . 320-n) and the plurality of ultrasonic microphones (330-1, 330-2, . . . 330-n) are spaced apart from one another. The distance between the plurality of ultrasonic transducers (320-1, . . . 320-n) and the plurality of ultrasonic microphones (330-1, 330-2, . . . 330-n) can vary depending on the design needs of the device.

Referring still to FIG. 3, the plurality of ultrasonic transducers (320-1, . . . 302-n) and the plurality of ultrasonic microphones (330-1, 330-2, . . . 330-n) is arranged around the IR lens (310). As one non-limiting example, two ultrasonic microphones (330-1, 330-2) are placed in horizontal direction and two ultrasonic microphones (330-3, 330-n) are placed in vertical direction. The ultrasonic transducers (320-1, . . . 320-n) may be placed at any position on the 3D ultrasound imaging system, but since the center position is occupied by the IR lens (310), the ultrasonic transducers (320-1, . . . 320-n) may be placed in corners. The IR lens (310) is part of the infrared system and is designed to focus infrared light. The particular number, location, and arrangement of the multiple ultrasonic transducers and microphones is provided as an example only. Other numbers, locations, and/or arrangements of the multiple ultrasonic transducers and microphones are possible.

Figure 4:
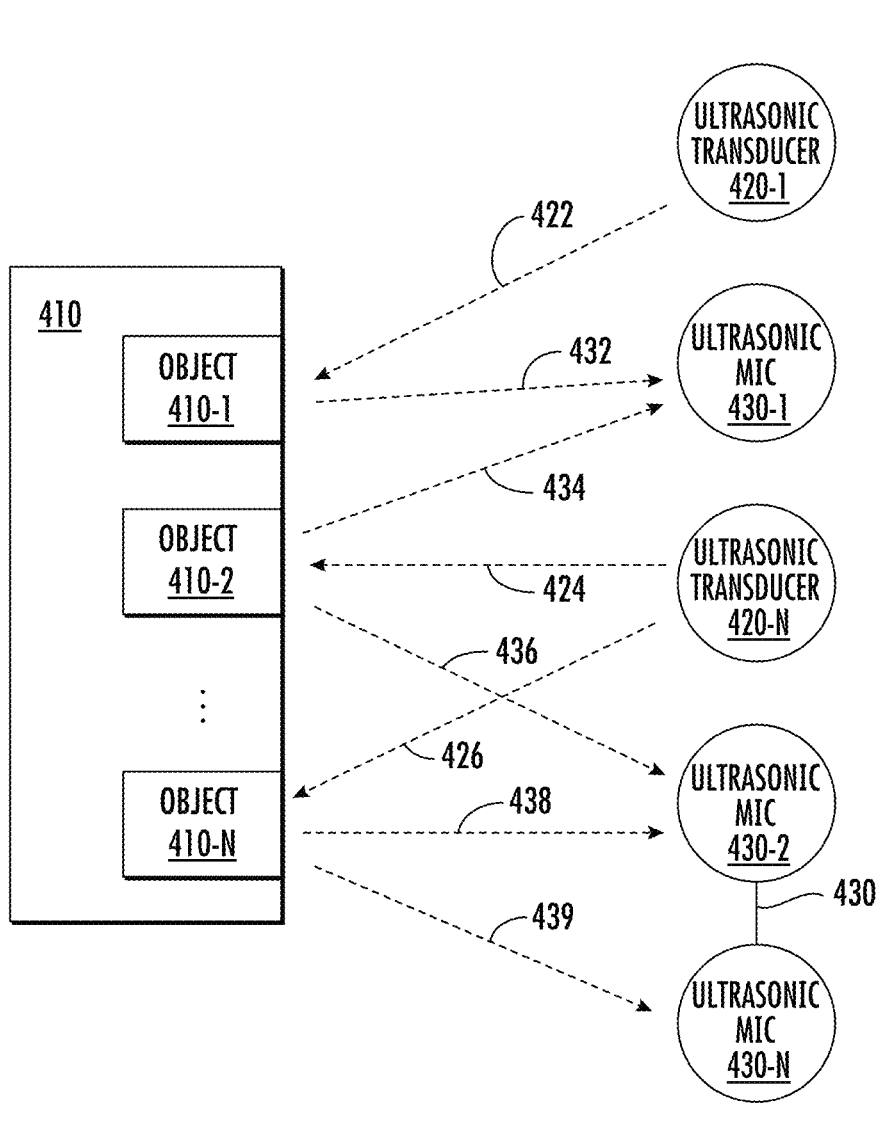
FIG. 4 depicts a graphical diagram of example interaction between a three-dimensional ultrasound imaging system and target scene according to example embodiments of the present disclosure.

FIG. 4 depicts a graphical diagram of example interaction between a 3D ultrasound imaging system and a target scene according to example embodiments of the present disclosure. The 3D ultrasound imaging system includes a plurality of ultrasonic transducers (420-1, . . . 420-n) and a plurality of ultrasonic microphones (430-1, 430-2, . . . 430-n). A target scene (410) includes multiple objects (410-1, 410-2, . . . 410-n). The plurality of ultrasonic transducers (420-1, . . . 420-n) can emit the outgoing ultrasonic waves in various directions and angles towards the objects in the target scene. The outgoing ultrasonic waves can be dual-frequency pulses, which means that the plurality of ultrasonic transducers (420-1, . . . 420-n) can emit waves at two different frequencies. The plurality of ultrasonic microphones (430-1, 430-2, . . . 430-n) can receive incoming ultrasonic waves. The incoming ultrasonic waves can also be dual-frequency pulses, meaning that the plurality of ultrasonic microphones (430-1, 430-2, . . . 430-n) can receive waves at two different frequencies.

In one implementation, the ultrasonic transducer (420-1) emits outgoing ultrasonic waves (422) in various directions and angles towards the target scene (410). The outgoing ultrasonic waves (422) encounter object (410-1) and parts of the ultrasonic waves (432) echo back. The ultrasonic microphone (430-1) receives the echoed ultrasonic waves (432), also called the incoming ultrasonic waves. As discussed above, the outgoing ultrasonic wave can have a detection range of a whole surface.

In yet another implementation, one ultrasonic transducer can emit outgoing ultrasonic waves that encounter multiple objects. For example, the ultrasonic transducer (420-*n*) emits ultrasonic waves (424, 426) in various directions and angles towards the target scene (410). The outgoing ultrasonic waves (424, 426) encounter objects (410-2, . . . 410-*n*) and parts of the ultrasonic waves (434, 436) echo back. The ultrasonic microphone (430-1) receives the echoed ultrasonic waves (434), and the ultrasonic microphone (430-2) receives the echoed ultrasonic waves (436) from the same object (410-2).

In yet another implementation, more than one ultrasonic microphone can receive incoming ultrasonic waves from the same object. For example, ultrasonic transducer (420-*n*) emits ultrasonic wave (426) in various directions and angles towards the target scene (410). The outgoing ultrasonic wave (426) encounter object (410-*n*) and parts of the ultrasonic waves (438, 439) echo back. The ultrasonic microphone (430-2) receives the echoed ultrasonic waves (438), and the ultrasonic microphone (430-*n*) receives the echoed ultrasonic waves (439) from the same object (410-*n*). The echoed ultrasonic waves are also called the incoming ultrasonic waves.

As discussed earlier, the outgoing ultrasonic waves (422, 424, 426) can be dual-frequency pulses.

Referring still to FIG. 4, the plurality of ultrasonic transducers (420-1, . . . 420-*n*) and the plurality of ultrasonic microphones (430-1, 430-2, . . . 330-*n*) can be spaced apart from one another. The distance between the plurality of ultrasonic transducers (320-1, . . . 320-*n*) and the plurality of ultrasonic microphones (330-1, 330-2, . . . 330-*n*) varies depending on the design needs of the device. To eliminate noises, enhance the quality and accuracy of the generated ultrasound, the minimum distance between the ultrasonic transducers and/or ultrasonic microphones can, in some implementations, be at least ½ wavelength.

Referring still to FIG. 4, the one or more objects (410-1, 410-2, . . . 410-*n*) can be moving objects. For example, moving objects can be humans, animals, and/or vehicles that emit thermal radiation. This can be particularly useful in applications like surveillance or vehicle detection, where identifying and tracking moving objects can be critical. The combination of thermal imaging and 3D ultrasound can provide a comprehensive view of the scene, enhancing the device's overall performance.

Figure 5:
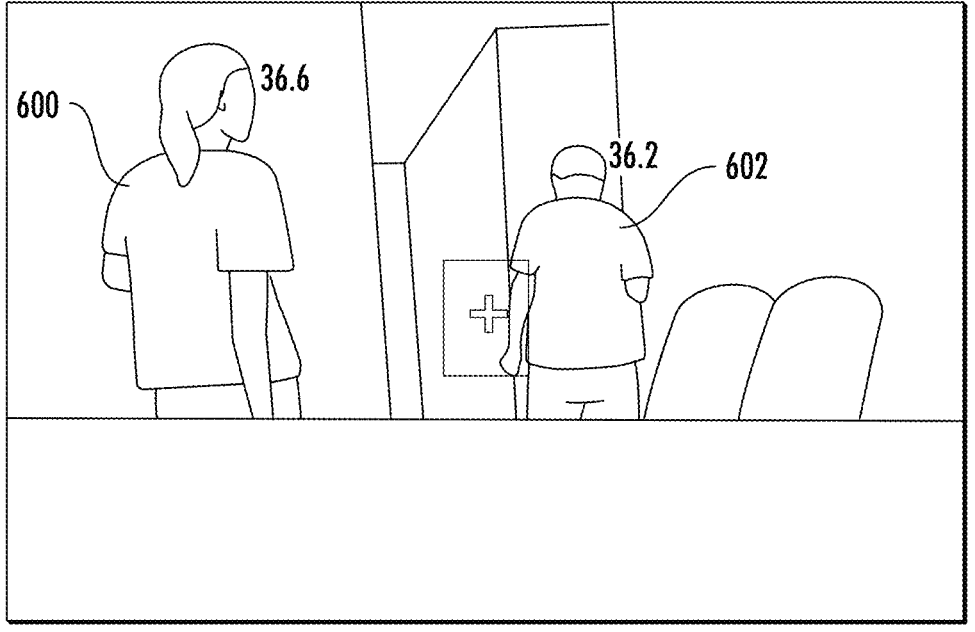
FIGS. 5 and 6 depict samples of images illustrating adjusted temperature information according to example embodiments of the present disclosure.
Figure 6:
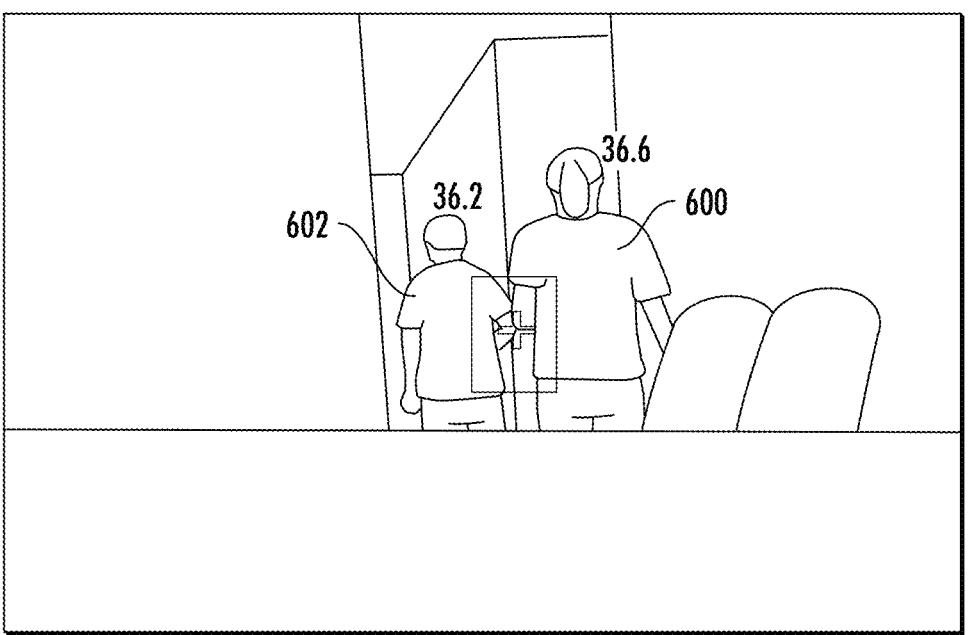

FIGS. 5 and 6 depict samples of visual thermal images according to example embodiments of the present disclosure. Particularly, FIGS. 5 and 6 depict two samples of a visual thermal image with moving objects occurring over a time interval. FIG. 5 includes object 600 and object 602. Both objects are moving and can be seen as walking away from a conference room or moving away from the thermal imager. At the time when the thermal imager captures the image in FIG. 5, an initial temperature for object 600 is 36.6 Celsius and an initial temperature for object 602 is at 36.2 Celsius. The thermal imager generates a thermal image based on the initial temperatures as shown in FIG. 5. FIG. 6 includes the same object 600 and object 602 after a time interval has passed (e.g., a few seconds). The objects 600 and 602 are walking away from a conference room or moving away from the thermal imager. As shown in FIG. 6, object 600 and object 602 are further away from the thermal imager, and the adjusted temperature for object 600 remains 36.6 Celsius while the adjusted temperature for object 602 remains 36.2 Celsius. Thus, the thermal imager determines adjusted temperature values for object 600 and object 602 based on the distance data and uses the adjusted temperature values to generate a more accurate thermal image. Further, despite the motion of the objects 600 and 602, the thermal imager is able to accurately adjust their temperature values, respectively.

Figure 7:
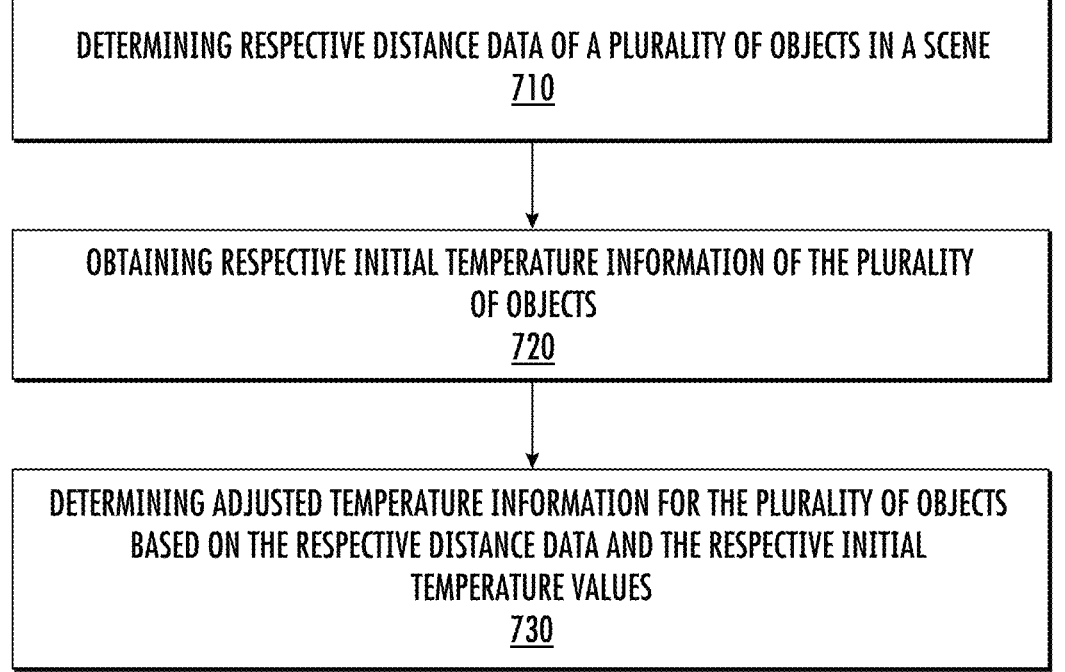
FIG. 7 depicts a flowchart diagram of an example method for a thermal imager that uses a three-dimensional ultrasound imaging system according to example embodiments of the present disclosure.

FIG. 7 depicts a flowchart diagram of an example method for a thermal imager that uses a three-dimensional (3D) ultrasound imaging system according to example embodiments of the present disclosure.

At (710), the thermal imager that includes the 3D ultrasound imaging system determines distance data of a plurality of objects of a target scene according to the incoming ultrasonic waves. The thermal imager that includes the 3D ultrasound imaging system can further determine directional data and time and speed data of the plurality of objects according to the outgoing and incoming ultrasonic waves. The plurality of objects can be moving objects.

At (720), the thermal imager that includes an infrared temperature system obtains respective initial temperature values of the plurality of objects. The infrared temperature system includes infrared (IR) lens having one or more associated IR sensors for detecting temperatures parameters of the plurality of objects. The IR lens is surrounded by a plurality of ultrasonic transducers and a plurality of ultrasonic microphones.

At (730), the thermal imager then determines adjusted temperature information for the plurality of objects based on the distance data for the plurality of objects and the respective initial temperature values for the plurality of objects. With the adjusted temperature values for the plurality of objects, the thermal imager can generate more accurate thermal image.

After determining the adjusted temperature information in block (730), the thermal imager can in some implementations generate an image illustrating the adjusted temperature information corresponding to the one or more objects in the target scene. This image, often referred to as a thermal image, is a visual representation of the temperature distribution across the target scene. Different temperature values can be represented by different colors or shades, with warmer areas typically shown in brighter or warmer colors and cooler areas shown in darker or cooler colors. The thermal image can provide a quick and intuitive way for users to understand the thermal conditions of the target scene.

When dealing with multiple objects in the target scene, the thermal imager is capable of displaying each object's adjusted temperature value separately. This can be achieved by assigning each object a distinct color or shade based on its adjusted temperature value. Alternatively, the thermal imager can overlay the temperature values onto a standard visual image of the scene, allowing users to see the temperature distribution in the context of the physical environment. This feature can be particularly useful in complex scenes with many objects, where understanding the spatial relationship between different objects can be important.

In some implementations, the method shown in FIG. 7 can be iteratively repeated for each of a number of time intervals. This feature enables the thermal imager to provide real-time temperature readings of the objects irrespective of their distance from the thermal imager or the motion of the objects.

The time interval can be set according to various factors such as the speed of the moving objects, the computation capability of the thermal imager, or the user's specific requirements. The time interval may be fixed or variable, depending on the situation. For example, in a fast-paced environment where the objects are moving quickly, a shorter time interval may be used to ensure that the temperature readings remain up-to-date. Conversely, in a slower-paced environment where the objects are moving more slowly, a longer time interval may be sufficient.

At each time interval, the infrared temperature system and the 3D ultrasound imaging system work in tandem to capture and update the initial temperature values and the distance data respectively. As the objects move, the 3D ultrasound imaging system tracks their position and updates the distance data accordingly. Simultaneously, the infrared temperature system captures the latest thermal data and updates the initial temperature values.

The temperature adjustment system then uses this updated information to calculate the adjusted temperature values for each moving object at each time interval. These adjusted temperature values take into account the changing distances between the thermal imager and the moving objects, providing accurate temperature readings that reflect the real-time conditions of the moving objects.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

The present disclosure includes the following illustrative examples.

One example includes a thermal imager for measuring temperature. The thermal imager also includes an infrared system to generate initial temperature information for one or more objects in a target scene. The imager also includes an ultrasound system to determine distance data for the one or more objects. The imager also includes a processor, coupled to the infrared system and the ultrasound system, configured to generate adjusted temperature information for the one or more objects based on the distance data and the initial temperature information, and to generate an image illustrating the adjusted temperature information corresponding to the one or more objects in the target scene.

A thermal imager according to any prior example, where the one or more objects may include two or more objects.

A thermal imager according to any prior example, where the ultrasound system is configured to determine respective distance data for each of the two objects.

A thermal imager according to any prior example, where the processor is configured to generate respective adjusted temperature information for each of the two objects based on the respective distance data.

A thermal imager according to any prior example, where the image generated by the processor depicts the two or more objects using color coding to visually indicate the respective adjusted temperature information.

A thermal imager according to any prior example, where the ultrasound system is configured to periodically determine new distance data for each of the two or more objects while the two or more objects are moving.

A thermal imager according to any prior example, where the processor is configured to periodically generate new adjusted temperature information for each of the two or more objects based on the new distance data for the object.

A thermal imager according to any prior example, where the processor is configured to periodically generate a new image that depicts illustrating the new adjusted temperature information corresponding to each of the two or more objects in the target scene.

A thermal imager according to any prior example, where the new adjusted temperature information for at least one of the two or more objects remains substantially the same during motion of the at least one object.

A thermal imager according to any prior example, where the ultrasound system is configured to determine new distance data of the one or more objects while the one or more objects is moving at a second time, and the processor configured to generate adjusted temperature information for the one or more objects based on the new distance data.

A thermal imager according to any prior example, where the visualization system is configured to display an image illustrating the adjusted temperature information of the one or more objects at the second time; and where the user interface is configured to display the image illustrating the adjusted temperature information of the one or more objects at the second time.

A thermal imager according to any prior example, where the temperature remains substantially the same during the first time and second time.

A thermal imager according to any prior example, where the thermal imager includes a portable device including a housing and a display, and where the infrared system, the 3d ultrasound imaging system, and the visualization system are housed within the housing.

A thermal imager according to any prior example, where the ultrasound system includes a plurality of ultrasonic transducers configured to emit the outgoing ultrasonic waves and a plurality of ultrasonic microphones configured to receive the incoming ultrasonic waves.

A thermal imager according to any prior example, where the outgoing ultrasonic waves may include dual-frequency pulses.

A thermal imager according to any prior example, where the plurality of ultrasonic transducers and the plurality of ultrasonic microphones are spaced apart from one another and arranged around an infrared (IR) lens.

A thermal imager according to any prior example, where at least two of the plurality of ultrasonic microphones are arranged horizontally or vertically around the IR lens.

A thermal imager according to any prior example, where the ultrasound system is configured to determine directional data of the one or more objects according to the outgoing and incoming ultrasonic waves, and where the temperature adjustment system is configured to generate the adjusted temperature values for the one or more objects based on the directional data.

A thermal imager according to any prior example, where the ultrasound system is configured to determine time and speed data of the one or more objects according to the outgoing and incoming ultrasonic waves, and where the temperature adjustment system is configured to generate the adjusted temperature values for the one or more objects based on the time and speed data.

A thermal imager according to any prior example, where the ultrasound system is configured to determine distance data for the one or more objects according to the time and speed data.

Another example includes a method for measuring temperature. The method also includes determining, by an ultrasound system, respective distance data of a plurality of objects in a scene. The method also includes obtaining, by an infrared system, respective initial temperature information of the plurality of objects. The method also includes determining adjusted temperature information for the plurality of objects based on the respective distance data and the respective initial temperature values.

A method according to any prior example method, further including generating, by a visualization system, an image illustrating the adjusted temperature information of the plurality of objects; and displaying, by a user interface, the image illustrating the adjusted temperature information of the plurality of objects.

A method according to any prior example method, where generating the image may include depicting the two or more objects using color coding to visually indicate the respective adjusted temperature information.

A method according to any prior example method, where determining the respective distance data may include periodically determining new distance data for each of the plurality of objects while the plurality of objects are moving.

A method according to any prior example method, where determining adjusted temperature information may include periodically generating new adjusted temperature information for each of the plurality of objects based on the new distance data for the object.

A method according to any prior example method, where the new adjusted temperature information for at least one of the plurality of objects remains substantially the same during motion of the at least one object.

A method according to any prior example method, where determining adjusted temperature information may include generating the adjusted temperature information based on the directional data.

What is claimed is:

1. A thermal imager for measuring temperature, comprising:

an infrared system to generate initial temperature information for a plurality of objects in a target scene;

an ultrasound system including:

a plurality of ultrasonic transducers configured to emit outgoing ultrasonic waves comprising dual-frequency pulses, and a plurality of ultrasonic microphones configured to receive incoming ultrasonic waves, wherein the ultrasound system is configured to determine distance data for the plurality of objects based on the outgoing ultrasonic waves and the incoming ultrasonic waves; and a processor, coupled to the infrared system and the ultrasound system, configured to generate adjusted temperature information for the plurality of objects based on the distance data and the initial temperature information, and to generate an image illustrating the adjusted temperature information corresponding to the plurality of objects in the target scene.

2. The thermal imager of claim 1, wherein the ultrasound system is configured to determine respective distance data for each of the plurality of objects, and the processor is configured to generate respective adjusted temperature information for each of the plurality of objects based on the respective distance data.

3. The thermal imager of claim 2, wherein:

the image generated by the processor depicts the plurality of objects using color coding to visually indicate the respective adjusted temperature information.

4. The thermal imager of claim 2, wherein the ultrasound system is configured to periodically determine new distance data for each of the plurality of objects while the plurality of objects are moving, and the processor is configured to periodically generate new adjusted temperature information for each of the plurality of objects based on the new distance data for each respective object of the plurality of objects, and wherein the processor is configured to periodically generate a new image that depicts illustrating the new adjusted temperature information corresponding to each of the plurality of objects in the target scene.

5. The thermal imager of claim 4, wherein the new adjusted temperature information for at least one object of the plurality of objects remains substantially the same during motion of the at least one object.

6. The thermal imager of claim 1, further comprising:

a visualization system configured to generate an initial image illustrating the initial temperature information of the plurality of at a first time; and a user interface configured to display the initial image illustrating the initial temperature information of the plurality of objects at the first time;

wherein the ultrasound system is configured to determine new distance data of the plurality of objects while the plurality of objects are moving at a second time, and the processor is configured to generate the adjusted temperature information for the plurality of objects based on the new distance data;

wherein the visualization system is configured to display the image illustrating the adjusted temperature information of the plurality of objects at the second time; and wherein the user interface is configured to display the image illustrating the adjusted temperature information of the plurality of objects at the second time;

wherein the temperature remains substantially the same during the first time and second time.

7. The thermal imager of claim 1, wherein the thermal imager comprises a portable device including a housing and a display, and wherein the infrared system, the ultrasound system, and the visualization system are housed within the housing.

8. The thermal imager of claim 1, wherein the initial temperature information for the plurality of objects is generated simultaneously with determining the distance data for the plurality of objects.

9. The thermal imager of claim 8, wherein the incoming ultrasonic waves comprise dual-frequency pulses.

10. The thermal imager of claim 1, wherein the plurality of ultrasonic transducers and the plurality of ultrasonic microphones are spaced apart from one another and arranged around an infrared (IR) lens.

11. The thermal imager of claim 10, wherein at least two of the plurality of ultrasonic microphones are arranged horizontally or vertically around the IR lens.

12. The thermal imager of claim 1, wherein the ultrasound system is configured to determine directional data of the plurality of objects according to the outgoing ultrasonic waves and the incoming ultrasonic waves, and wherein the processor is configured to generate the adjusted temperature information for the plurality of objects based on the directional data.

13. The thermal imager of claim 1, wherein the ultrasound system is configured to determine time and speed data of the plurality of objects according to the outgoing ultrasonic waves and the incoming ultrasonic waves, and wherein the processor is configured to generate the adjusted temperature information for the plurality of objects based on the time and speed data.

14. The thermal imager of claim 13, wherein the ultrasound system is configured to determine the distance data for the plurality of objects according to the time and speed data.

15. A method for measuring temperature, comprising:

determining, by an ultrasound system including a plurality of ultrasonic transducers configured to emit outgoing ultrasonic waves comprising dual-frequency pulses and a plurality of ultrasonic microphones configured to receive incoming ultrasonic waves, respective distance data of a plurality of objects in a scene based on the outgoing ultrasonic waves and the incoming ultrasonic waves;

obtaining, by an infrared system, respective initial temperature information of the plurality of objects; and determining adjusted temperature information for the plurality of objects based on the respective distance data and the respective initial temperature information.

16. The method of claim 15, further comprising:

generating, by a visualization system, an image illustrating the adjusted temperature information of the plurality of objects; and displaying, by a user interface, the image illustrating the adjusted temperature information of the plurality of objects.

17. The method of claim 16, wherein:

generating the image comprises depicting the plurality of objects using color coding to visually indicate the adjusted temperature information.

18. The method of claim 15, wherein determining the respective distance data comprises periodically determining new distance data for each of the plurality of objects while the plurality of objects are moving, and determining the adjusted temperature information comprises periodically generating new adjusted temperature information for each of the plurality of objects based on the new distance data.

19. The method of claim 18, wherein the new adjusted temperature information for at least one object of the plurality of objects remains substantially the same during motion of the at least one object.

20. The method of claim 15, further comprising determining directional data of the plurality of objects according to the outgoing ultrasonic waves and the incoming ultrasonic waves, wherein determining the adjusted temperature information comprises generating the adjusted temperature information based on the directional data.

* * * * *